(12) United States Patent
Stecker et al.

(10) Patent No.: US 10,234,547 B2
(45) Date of Patent: Mar. 19, 2019

(54) SENSOR WITH OBLIQUE-ANGLE DISPLAY

(71) Applicant: Banner Engineering Corporation, Minneapolis, MN (US)

(72) Inventors: John Alyn Stecker, Maple Lake, MN (US); Matthew Alexander Payne, Columbia Heights, MN (US)

(73) Assignee: BANNER ENGINEERING CORPORATION, Minneapolis, MN (US)

(*) Notice: Subject to any disclaimer, the term of this patent is extended or adjusted under 35 U.S.C. 154(b) by 1284 days.

(21) Appl. No.: 14/021,384

(22) Filed: Sep. 9, 2013

(65) Prior Publication Data

US 2015/0068310 A1   Mar. 12, 2015

(51) Int. Cl.
| | |
|---|---|
| *G01C 3/08* | (2006.01) |
| *G01S 7/51* | (2006.01) |
| *G01S 17/02* | (2006.01) |
| *G01S 7/481* | (2006.01) |
| *G01S 7/64* | (2006.01) |
| *G01S 15/04* | (2006.01) |
| *G01S 17/08* | (2006.01) |

(52) U.S. Cl.
CPC .............. *G01S 7/51* (2013.01); *G01C 3/08* (2013.01); *G01S 7/4813* (2013.01); *G01S 7/64* (2013.01); *G01S 15/04* (2013.01); *G01S 17/026* (2013.01); *G01S 17/08* (2013.01)

(58) Field of Classification Search
CPC . G01S 7/51; G01S 7/4813; G01S 7/64; G01S 15/04; G01S 17/026; G01S 17/08; G01C 3/08
See application file for complete search history.

(56) References Cited

U.S. PATENT DOCUMENTS

| | | | |
|---|---|---|---|
| 7,013,571 B2* | 3/2006 | El-Katcha | G01C 15/004 33/290 |
| 7,193,689 B2* | 3/2007 | Lin | G01C 15/002 356/4.01 |
| 2008/0094606 A1* | 4/2008 | Schwarz | G01C 15/00 356/4.01 |

* cited by examiner

*Primary Examiner* — Samantha K Abraham
(74) *Attorney, Agent, or Firm* — Merchant & Gould P.C.

(57) ABSTRACT

A sensor comprises a detector defining a zone axis and adapted to receive a signal from within a zone around the zone axis and to generate an electrical signal, and a display module defining a display plane and adapted to display a pattern in the display plane based on the electrical signal, the display being oriented along an axis forming an angle with the zone axis such that the pattern is visible both from a direction parallel to the zone axis and from a direction perpendicular to the zone axis. In certain examples, the angle is about 45°, 40°-50°, 35°-55° or 25°-65°.

16 Claims, 7 Drawing Sheets

SENSOR WITH OBLIQUE-ANGLE DISPLAY

INTRODUCTION

This disclosure generally relates to detecting objects and measuring distance from an object to a sensor. More specifically, the disclosure relates to sensors such purposes and having integrated displays of the measurement results.

Sensors, such as optical sensors, have been used to automatically monitor the presence of objects in certain defined regions for applications such as industrial safety and automation. In one example type of application, an optical device has a transmitter that emits pulsed light signals into a monitored region and a sensor that detects signals resulting from the interaction, such as reflection or scattering, between the transmitted light signals and any object located in the region. When an object is located in the monitored region, light signals above a threshold level may be detected as a result of transmitted light being reflected or scattered into the sensor. In certain applications, threshold levels correspond to critical distances, and certain actions may be taken automatically when objects are detected within the critical distances.

Sensors with integrated displays are known. Such sensors may be read and/or calibrated on-site without using external instruments. Various such sensors have been devised to suit particular applications. A need remains for versatile sensors that are suitable for a wide variety of installation needs.

SUMMARY

Certain examples disclosed in the present application provide sensors with integrated displays with displayed patterns visible from both the rear of the sensor and another direction perpendicular to the rear-to-front direction. Here, "front" is the direction that the detector (and optionally the transmitter) in the sensor faces. In one aspect of the disclosure, a sensor is adapted to detect objects in a zone around an axis. For example, a sensor can include a detector adapted to detect signals from the zone around the axis, or include a transmitter and detector adapted to, respectively, transmit signals and detect a portion of the transmitted signal reflected by an object located in the zone around the axis (i.e., the sensor can be thought of as having a front side facing a direction along the zone axis). The detector further includes a display module adapted to display a pattern based on the electrical signal. The display module can also be further adapted to display a pattern indicative of a configuration parameter (such as a threshold) of the detector. The display pattern is oriented such that it is visible from a range of directions that include a direction along the zone axis and a direction perpendicular to the zone axis. For example, the pattern can be oriented in a direction that form an angle of between 25° to 65°, between 35° to 55°, or between 40° to 50°, with the zone axis.

BRIEF DESCRIPTION OF THE DRAWINGS

FIG. 7 schematically shows (a) a perspective view, (b) a top view, (c) side view and (d) rear view of a sensor according to an aspect of the disclosure.

DETAILED DESCRIPTION

Machine sensing finds a wide range of applications. Devices for automatically detecting the presence of objects in a monitored region, or the distance of an object from a sensor, for example, are used in applications such as industrial safety and automation. In many applications, while external instruments can be used to measure the output of a sensor or calibrate a sensor, it is desirable to be able to perform such tasks on-site and without the aid of external instruments. For example, in applications where a sensor is used to induce a certain action when an object is detected within a threshold distance from the sensor, it may be desirable to have a readout display on the sensor unit itself and display a human-readable pattern, such as a digital numerical value, that indicates the detected distance. Further, it may be useful to have an indicator, such as an indicator light, that is on or near the sensor and generates a human-perceptible signal (e.g., light or beep) when the threshold distance is reached.

Sensors with display panels and/or threshold indicators exist. Typically, display panels are located on top of the sensor housing or on the rear wall of the sensor, with the signal receiving element facing the region to be monitored by the sensor. Such sensors, however, may be of limited utility when the configuration of the installation site renders viewing of the display from either the top or rear of the sensor impossible or highly inconvenient.

Certain examples disclosed in the present application provide advantageous configurations of sensors such that the digital display is visible from both the top and rear of the sensor. In one aspect of the disclosure, a sensor is adapted to detect object located in a zone around an axis. For example, a sensor can include a detector adapted to detect signals from a zone around an axis. Alternatively, a sensor can include a transmitter adapted to transmit signals into a region, and a detector for detecting a portion of the transmitted signal reflected by objects located in a zone around an axis. That is, the sensor can be thought of as having a front side facing a direction along the zone axis). The detector includes a transducer and electronics (such as preamplifier, amplifier, comparator, analog-to-digital converter, microcontroller and other analog and digital circuitry) adapted to generate an electrical signal indicative to the detected signals.

The detector can be any suitable type, including for example light or sound based transducers. Examples include photoelectric detectors, ultrasonic detectors, optical time-of-flight (TOF) detectors and color detectors (e.g., detectors for sensing component colors and determining the color of the object based on the sensed component colors). The sensor can also further include a transmitter, such as a laser source for transmitting signals into a monitored region, a portion of the transmitted signals being reflected from a target or reference object (such as a reflector or background surface) back into the detector. In certain applications, such as certain ultrasonic applications, a single transducer (such as a piezoelectric) can be used as both a transmitter (when energized by a driver circuit) and a receiver (when energized by the incoming signals).

The sensor further includes a display module, such as a light-emitting diode (LED) display, organic light-emitting diode (OLED), or liquid crystal display (LCD), that is adapted to display a pattern based on the electrical signal. The pattern can be numerical, alphabetical or alphanumerical, a bar graph or any other pattern that is a representation of the electrical signal generated by the detector. The display module can be further adapted to display a pattern indicative of a configuration parameter of the detector, or any other parameter or condition of the detector. The configuration parameter can be, for example, a threshold voltage to which the signal indicative of the detected signal is to be compared, or a threshold distance corresponding to the threshold voltage. Examples of other parameters or conditions include error codes and alarm states.

The display pattern is oriented such that it is visible from a range of directions that include a direction along the zone axis and a direction perpendicular to the zone axis. For example, the pattern can be oriented in a direction that form an angle of from 25° to 65°, from 35° to 55°, from 40° to 50°, or from 1° to 89° with the zone axis.

The sensor can further include a housing having a front side and rear side, which are spaced apart along the zone axis, and a top side. The display pattern can be located substantially between the top and rear sides and facing a direction between the top and rear of the sensor.

The sensor can further include an indicator (visual or audio) that generates a signal that indicates a predefined condition being met by the detected signal, such as reaching or exceeding a threshold level. The indicator can be disposed at any location suitable for perception by a user. For example, the indicator can be an LED located on the top side or rear side of the sensor, or the oblique face of the display pattern. The indicator can be mounted to be flush with the surface of the housing, or protruding from the surface.

The sensor can additionally include a switch that, when actuated, changes the sensor to a different mode of operation, or changes the information displayed by the display module. For example, the switch can be adapted to switch the sensor from a normal operating mode, in which the sensor compares the detected signals with a predefined threshold and generates a signal indicative of the threshold having been reached, to a configuration (or "learning") mode, in which the threshold, detector gain or some other detector characteristic is changed. In some examples, the indicator can form a part of the switch. For example, an indicator can include a housing that can be an actuator (e.g., mechanical, capacitive or magnetic) of the switch.

The sensor can further include an adjustment module accessible from outside the housing and adapted to adjust a detector characteristic (e.g., gain or threshold). For example, the adjustment module can be a potentiometer. It can also be one or more switches for digitally stepping up or down a detector characteristic (e.g., gain or threshold).

Figure 1:
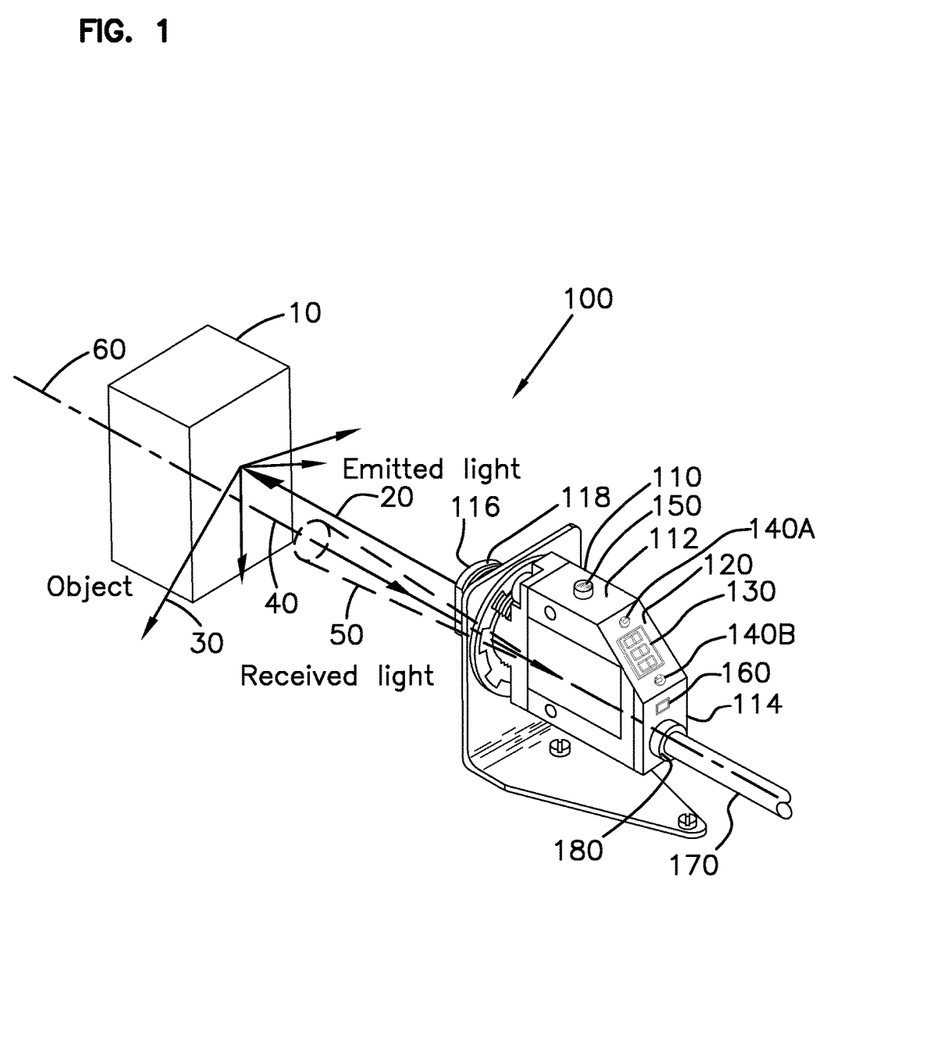
FIG. 1 schematically shows a sensor and its operating environment according to one aspect of this disclosure.

Specific examples are disclosed below, some with the aid of the drawings. FIG. 1 schematically shows a sensor (100) in its operating environment. The sensor (100), which in this example is an optical sensor, includes a transmitter (not shown in FIG. 1), which transmits a light beam (20) into a monitored region. Where an object (or target) (10) is present in the region, the transmitted light (20) is scattered into light (30) traveling in various directions. When the object is located inside a zone of detection (50), a portion (40) of the scattered light is received and detected by a detector (not shown in FIG. 1). The zone of detection (50) in this example revolves generally around a zone axis (60). The zone axis (60) is sometimes referred to as the "sensing axis", or, in the case of an optical sensor, the "optical axis", of the sensor. The zone axis (60) can also be more practically defined along a direction in which the sensor (100) is aimed.

The sensor (100) includes a housing (110) that encloses the detector and transmitter and associated electronics. The housing (110) has a front side (116), which in this case is the front end of a front barrel portion (118), and a rear side (114), which is spaced apart from the front end (116) along the zone axis (60). The housing (110) further includes a top side (112).

Figure 2:
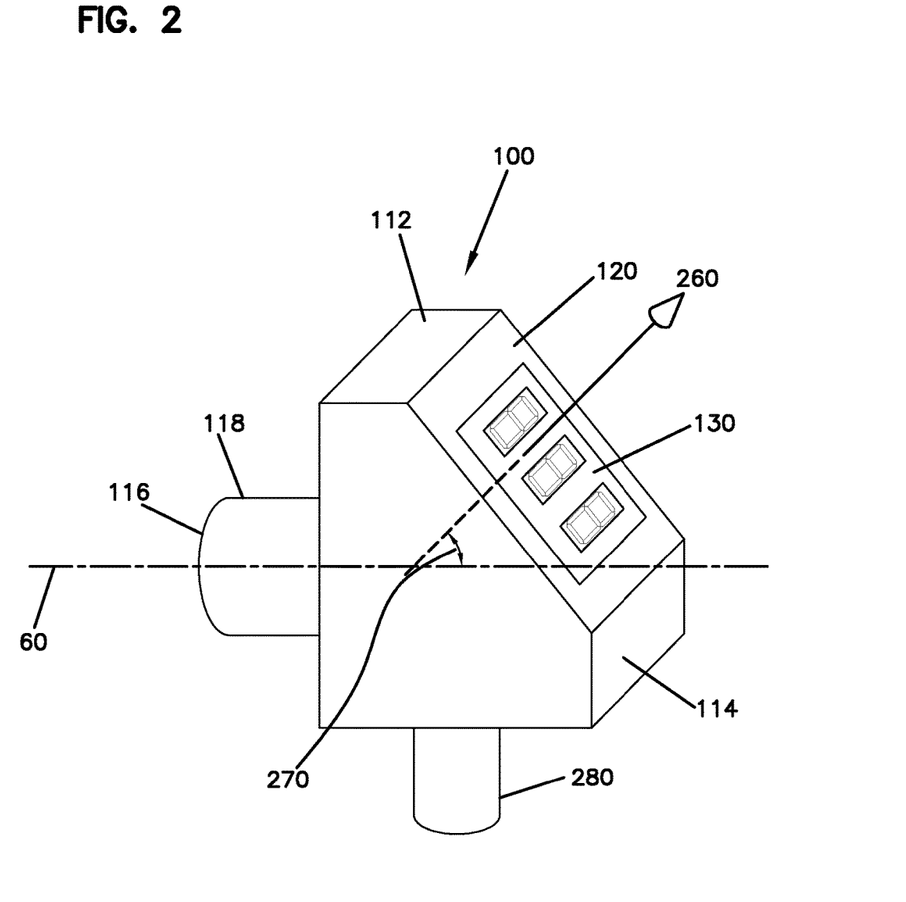
FIG. 2 schematically shows a sensor according to an aspect of the disclosure.

The sensor (100) further includes a display module having a display (120) that displays pattern (130). The display (120) is disposed between the top (112) and rear (114) sides and oriented in a direction between the orientations of the two sides (112, 114). As schematically illustrated in FIG. 2, the display (120) is orientated in a direction (260) at an angle, α, from the zone axis (60). The angle is chosen such that the pattern (130) is visible by a user both from a direction along the zone axis (60) (i.e., from the rear of the sensor (100)) and from a direction perpendicular to the zone axis (60) (e.g., from the top of the sensor (100)). For example, α can be 45°, 40°-50°, 35°-55° or 25°-65°.

Referring again to FIG. 1, the sensor (100) in this example further includes an adjustment module comprising a pair of switches (140A, 140B) for adjusting a characteristic of the detector or the display pattern (130). The sensor (100) in this example also includes an indicator such as an LED, which changes its state (e.g., becomes illuminated) when the detected signal meets a certain condition. For example, the detector can generate a threshold voltage and compare a voltage generated corresponding to the detected signal. When the voltage corresponding to the detected signal is equal to, or greater than, the threshold voltage, the detector generates a signal that results in the indicator changing from an un-illuminated state to an illuminated state. Thus, for example, in the normal operation mode of the detector, the display pattern (130) can display a number corresponding to the distance between an object (10) being detected and the sensor (100). The indicator (150) remains unlit (or emits a color indicating the object is outside a threshold distance) until the object (10) is at or closer than a threshold distance, when the indicator (150) becomes lit (or emits a color indicating the object is within a threshold distance).

In the example shown in FIG. 1, the sensor (100) further includes a switch (160), which, when actuated, causes the detector to switch to a different mode of operation, and/or causes the display module (120) to change the information it displays. For example, actuating the switch (160), in one example, causes the detector to switch to a configuration, or "learning," mode. In the normal operation mode, the detector compares the detected signal with a threshold level and generates a signal changing the state of the indicator (150) when the detected signal reaches the threshold; in the configuration mode, a characteristic of the detector is adjusted so that the state of the indicator (150) changes under a different measurement condition, such as a different threshold distance between the object (10) and sensor (100). The adjustment can be done by using the adjustment module, such as the adjustment switches (140A, 140B). The changes can be effectuated in several ways. For example, either the threshold voltage (corresponding to a threshold distance) or the detector gain can be adjusted using the adjustment module to achieve the desired change in distance at which the indicator changes its state (and appropriate action is initiated in response to the critical distance being reached).

The sensor (100) can also be configured such that the actuation of the switch (160) changes the information displayed by the display module (120). For example, the display module can be switched to displaying the threshold distance so that the threshold distance can be directly adjusted. Alternatively, the measured distance can remain displayed in the configuration mode, with an object placed at the desired threshold distance from the sensor (100). The threshold voltage of the detector or the detector gain can be adjusted until the indicator (150) switches state.

The sensor (100) further includes an interface cable (170), or a connector (180) (see also FIG. 4) for connecting to an interface cable, for connecting the sensor (100) to such external devices as a controller and power supply. In the example illustrated in FIG. 1, the cable (170) is fed through the rear side (114). Other configurations are also possible, including (referring to FIG. 2) having the cable (280) fed through the bottom side of the housing (110) in a direction perpendicular to the zone axis (60). In another example, illustrated in FIG. 5, the cable (570) is connected to the sensor (100) through a connector (580) that is rotatable relative to the housing (510). The connector (580) in this case is rotatable about an axis 45° from the zone axis (60) so that the cable (570) can be rotated to be either parallel with, or perpendicular to, the zone axis (60). The sensor (100) can thus be installed in a variety of sites.

Figure 3:
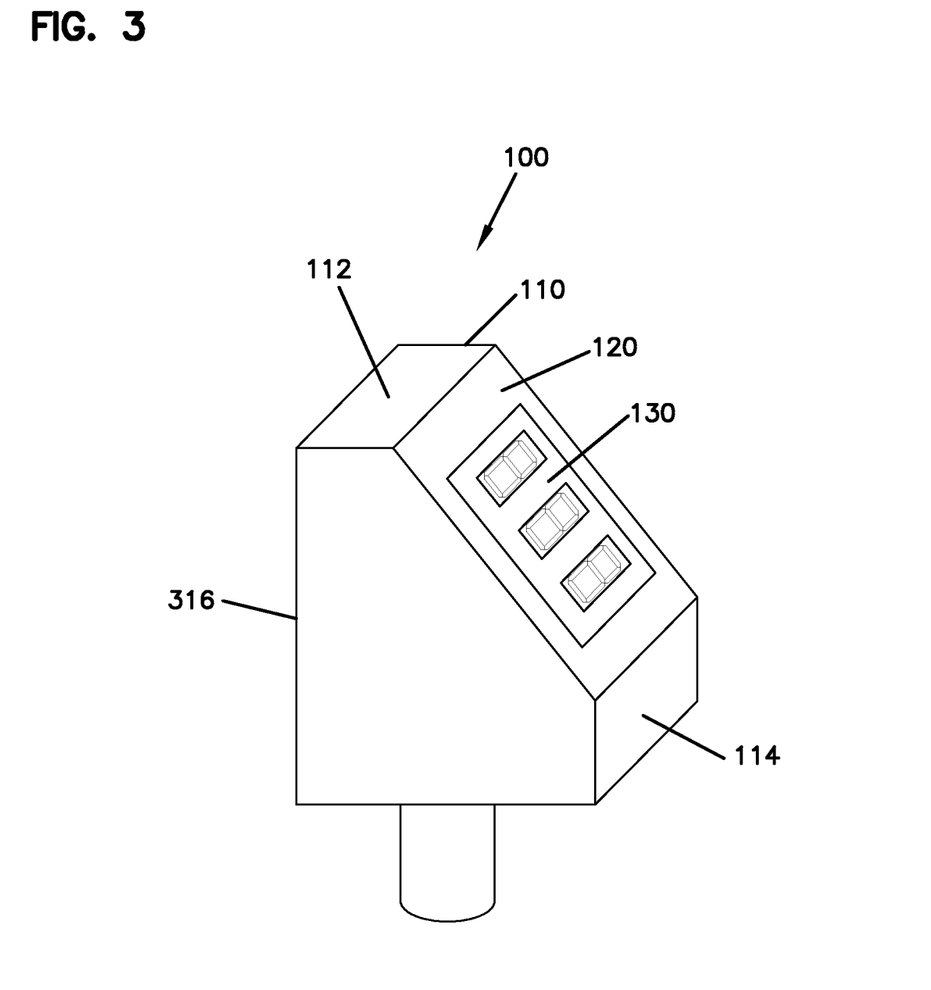
FIG. 3 schematically shows a variation on the sensor shown in FIG. 2 according to an aspect of the disclosure.
Figure 4:
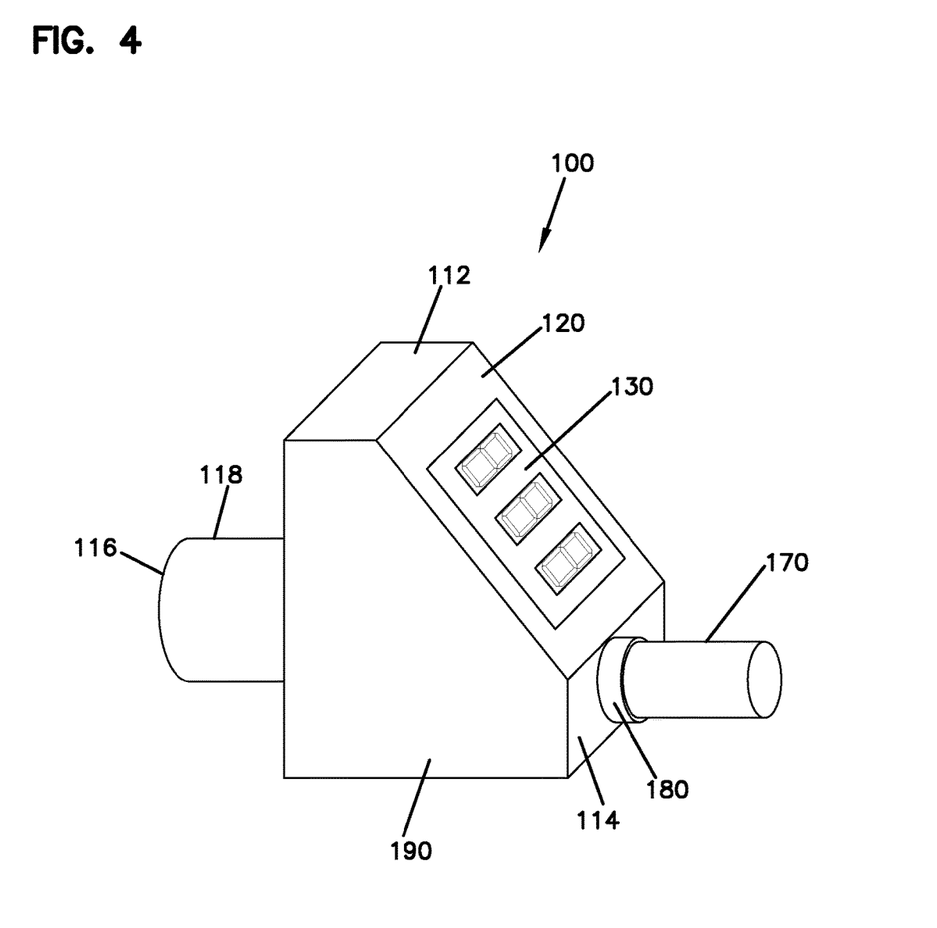
FIG. 4 schematically shows another variation on the sensor shown in FIG. 2 according to an aspect of the disclosure.
Figure 5:
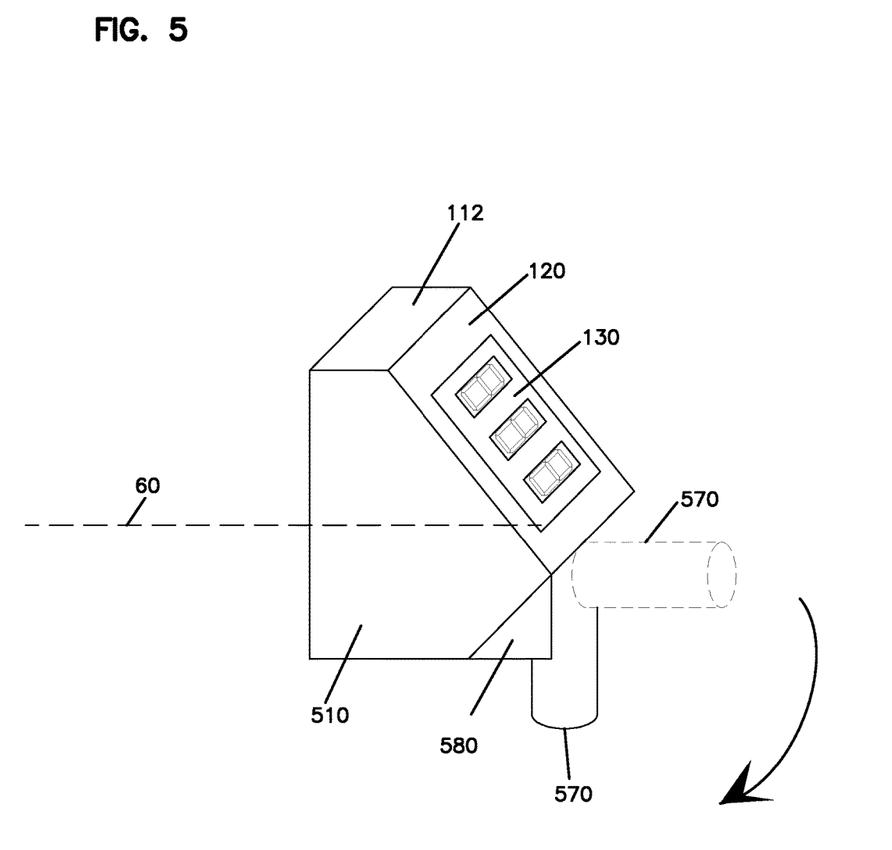
FIG. 5 schematically shows a sensor with a rotatable cable connector according to an aspect of the disclosure.
Figure 6:
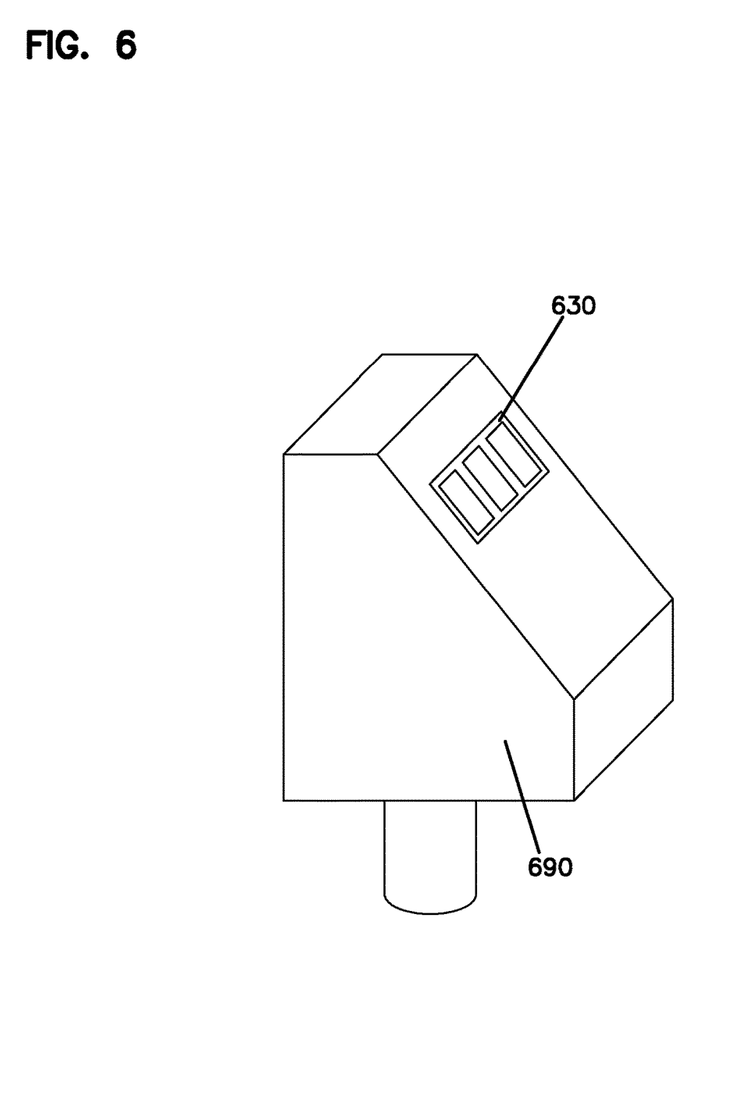
FIG. 6 schematically shows a sensor with a display with a display pattern rotated 90° from that of the displays shown in FIGS. 1-5 according to an aspect of the disclosure.

The sensor (100) can have a variety of alternative configurations and features. For example, as illustrated in FIG. 3, the housing (110) needs not include a front barrel (118) as in FIG. 1, but can have a flat front side (316). As another example, as illustrated in FIGS. 4 and 6, the display pattern (130) can be visible either along a direction parallel to the lateral sides (190) of the housing (FIG. 4) or it (630) can be perpendicular to the lateral sides (690) (FIG. 6).

Figures 7A, 7B:
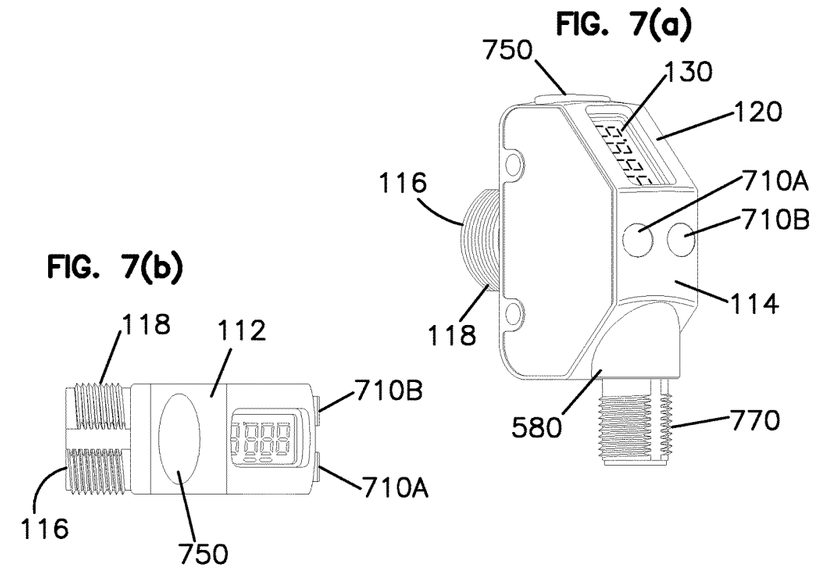
Figure 7C:
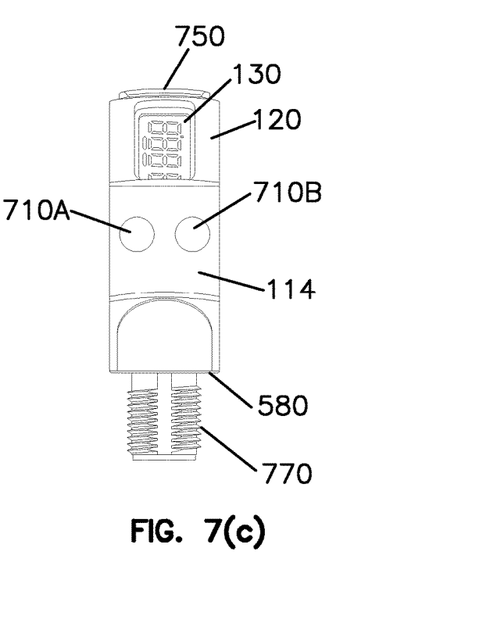
Figure 7D:
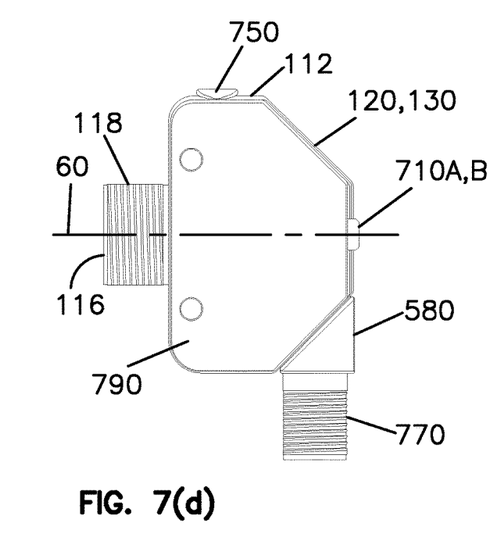

Another example is schematically illustrated in FIG. 7, including (a) a perspective view, (b) a top view, (c) a side view and (d) a rear view. In this example, the sensor (100) includes the display (120) with the display pattern (130) oriented at an angle from the zone axis (60) as in the examples disclosed in the examples above. The sensor (100) also has a rotatable cable connector (580), as the example in FIG. 5. The sensor (100) further includes an adjustment module having two switches (710A, 710B), which perform similar functions as the switches (140A, 140B) described above but are located on the rear side (114) and are arranged along a direction perpendicular to the lateral sides (790).

The sensor (100) in FIG. 7 further includes an indicator (750) on the top side, similar to the indicator (150) in FIG. 1. However, the indicator (750) is also a switch, performing the function of the switch (160) in FIG. 1. For example, the housing of the indicator (750) can be part of a mechanical, capacitive or magnetic switch. For a mechanical switch, for example, the housing can flex to allow a mechanical switch button under the indicator (750). If the switch is to be of a capacitive or magnetic type, the indicator housing can include a window covering material that allows electromagnetic signal to pass while at the same time allow the indicator light to pass through.

CONCLUSION

A device and method have been disclosed, wherein a sensor includes a readout display facing a direction at an angle (e.g., 25° to 65°) from the optical axis of the sensor such that the display is visible from a range of directions, from zero to 90° relative to the sensing axis of the sensor (e.g., optical axis of an optical sensor). Such an orientation of the display enables the sensor to be installed in a variety of locations and configurations that are not suitable for sensors with displays facing in the direction either perpendicular to, or parallel to, the optical axis.

Because many embodiments of the invention can be made without departing from the spirit and scope of the invention, the invention resides in the claims hereinafter appended.

We claim:

1. A sensor adapted to detect objects, the sensor comprising:
    a detector defining a zone axis and adapted to receive a signal from within a zone around the zone axis and to generate an electrical signal;
    a display module defining a display plane and adapted to display a symbol pattern in the display plane based on the electrical signal, the display plane facing an orientation axis forming an oblique angle with the zone axis; and
    a housing at least partially enclosing the detector and display module, the housing having a front side, rear side and upper side, the front side and rear side spaced apart from each other generally along the zone axis and each oriented in a fixed direction relative to the zone axis, the display plane being exposed to outside of the housing and disposed between, and oriented in a fixed direction relative to, the upper side and rear side.

2. The sensor of claim 1, wherein the orientation axis forms an angle of between about 25° to about 65° with the zone axis.

3. The sensor of claim 2, wherein the angle between the zone axis and orientation axis of the display plane is between about 40° and 50°.

4. The sensor of claim 1, wherein the detector comprises a photoelectric detector.

5. The sensor of claim 4, further comprising a light emitter proximal to the photoelectric detector and adapted to transmit light substantially along the zone axis.

6. The sensor of claim 1, the detector further adapted to generate a threshold signal, wherein the electrical signal is indicative of a parameter of the received signal or a level of the threshold signal.

7. The sensor of claim 6, wherein the detector is adapted to compare a signal indicative of a parameter of the received signal with the threshold signal level and generate a signal when the signal indicative of a parameter of the received signal meets a predetermined condition as compared with the threshold signal level.

8. The sensor of claim 7, further comprising an indicator module having a plurality of states of indication and adapted to change from one of the plurality of states to another one of the plurality of states when the signal indicative of a parameter of the received signal meets a predetermined condition as compared with the threshold signal level.

9. The sensor of claim 8, further comprising a switch operatively connected to the detector and switchable to a plurality of switch states, each of which configured to put the detector to a respective one of a plurality of modes of operation, wherein the indicator module is adapted to change the state of the switch when operated on by an operator.

10. The sensor of claim 1, wherein the detector comprises a sonic transducer.

11. The sensor of claim 10, further comprising a driver circuit operatively connected to the sonic transducer and adapted to actuate the transducer to transmit sonic waves; and a receiver circuit operatively connected to the sonic transducer and adapted to measure sonic waves received by the transducer.

12. The sensor of claim 1, further comprising an adjustment module operatively connected to the detector and manually accessible from outside the housing, the adjustment module being adapted to vary an operating parameter of the sensor.

13. The sensor of claim 12, the operating parameter being one of the threshold signal level and gain of the photoelectric detector.

14. The sensor of claim 1, further comprising an electrical connector for connecting the detector with a circuit outside the housing, the connector being pivotally mounted on the housing.

15. The sensor of claim 1, further comprising a transmitter at least partially disposed inside the housing and adapted to transmit a signal, wherein a detector is adapted to receive at least a portion of the transmitted signal reflected by an object when the object is located in the zone.

16. The sensor of claim 1, further comprising a housing at least partially enclosing the detector and display module, the housing having a front side facing a direction generally along the zone axis, the display plane being visible to outside of the housing and facing a direction forming an oblique angle with the direction that the front side faces.

* * * * *